(12) United States Patent
Brachet

(10) Patent No.: US 12,281,666 B2
(45) Date of Patent: Apr. 22, 2025

(54) CIRCULAR PIN CLIP WITH FIXED SPREADER

(71) Applicant: LISI AEROSPACE, Paris (FR)

(72) Inventor: Julien Brachet, Mehun sur yèvre (FR)

(73) Assignee: LISI AEROSPACE, Paris (FR)

( * ) Notice: Subject to any disclaimer, the term of this patent is extended or adjusted under 35 U.S.C. 154(b) by 0 days.

(21) Appl. No.: 17/790,723

(22) PCT Filed: Feb. 4, 2021

(86) PCT No.: PCT/EP2021/052658
§ 371 (c)(1),
(2) Date: Jul. 1, 2022

(87) PCT Pub. No.: WO2021/156362
PCT Pub. Date: Aug. 12, 2021

(65) Prior Publication Data
US 2024/0263660 A1    Aug. 8, 2024

(30) Foreign Application Priority Data
Feb. 6, 2020   (FR) ..................................... 2001167

(51) Int. Cl.
*F16B 19/10*        (2006.01)
(52) U.S. Cl.
CPC ................... *F16B 19/109* (2013.01)
(58) Field of Classification Search
CPC ...... F16B 13/06; F16B 19/109; F16B 21/125; F16B 13/0833; F16B 33/002; B25B 31/005
(Continued)

(56) References Cited

U.S. PATENT DOCUMENTS

| 2,463,731 A | * | 3/1949 | Whalen | F16B 19/109 |
| | | | | 269/48.4 |
| 3,233,504 A | * | 2/1966 | Jones | B25B 31/005 |
| | | | | 269/48.3 |

(Continued)

FOREIGN PATENT DOCUMENTS

EP    0162131 A1 * 11/1985
EP    1450053        8/2004

(Continued)

OTHER PUBLICATIONS

Pothmann, Johannes, International Search Report, Apr. 23, 2021, 7 pages, European Patent Office, Rijswijk, Netherlands.

(Continued)

*Primary Examiner* — Kristina R Fulton
*Assistant Examiner* — Jock Wong
(74) *Attorney, Agent, or Firm* — Henricks Slavin LLP

(57) ABSTRACT

A clip, for use with structural parts, includes a main tubular body extending along a longitudinal axis and having a bearing face intended contact a first face of the structural parts, a clamp able to pass through opposite perforations, in the parts, and being movable along the longitudinal axis, driven by the rotation of a tie rod having a tapped bore engaging a threaded end of the clamp, the clamp further including branches that are radially and progressively separable along a separator, placed between the branches and fixed relative to the main body, under the effect of the recoil of the clamp, the separator including a transverse part introduced into a longitudinal groove of the clip and rotationally blocked in a groove provided in an element that is fixed relative to the main body.

13 Claims, 3 Drawing Sheets

(58) Field of Classification Search
USPC ....... 411/347, 21, 45, 46, 47, 48, 49, 50, 51, 411/52, 54
See application file for complete search history.

(56) References Cited

U.S. PATENT DOCUMENTS

| | | | | |
|---|---|---|---|---|
| 3,260,151 | A * | 7/1966 | Jones | B25B 31/005 |
| | | | | 269/48.3 |
| 4,537,542 | A * | 8/1985 | Pratt | F16B 19/109 |
| | | | | 24/607 |
| 5,042,787 | A * | 8/1991 | Duffaud | B21J 15/42 |
| | | | | 269/48.4 |
| 7,048,266 | B2 * | 5/2006 | Starr | B21J 15/42 |
| | | | | 269/25 |
| 8,448,929 | B2 * | 5/2013 | Prot | B25B 31/005 |
| | | | | 269/48.2 |
| 10,527,080 | B2 * | 1/2020 | Bigot | F16B 19/109 |
| 11,867,213 | B2 * | 1/2024 | Brachet | F16B 19/109 |
| 2004/0164475 | A1 * | 8/2004 | Anderson | B64F 5/10 |
| | | | | 269/49 |
| 2005/0169726 | A1 * | 8/2005 | McClure | F16B 37/043 |
| | | | | 411/55 |
| 2010/0314495 | A1 | 12/2010 | Dazet et al. | |
| 2016/0312815 | A1 * | 10/2016 | Bigot | B23P 19/04 |
| 2017/0307002 | A1 * | 10/2017 | McClure | F16B 19/109 |
| 2021/0148393 | A1 * | 5/2021 | McClure | F16B 19/109 |

FOREIGN PATENT DOCUMENTS

| | | |
|---|---|---|
| EP | 3147520 | 3/2017 |
| FR | 3014969 | 6/2015 |
| FR | 3080155 | 10/2019 |
| GB | 959936 A | 6/1964 |

OTHER PUBLICATIONS

Pothmann, Johannes, Written Opinion, 6 pages, European Patent Office, Rijswijk, Netherlands.

* cited by examiner

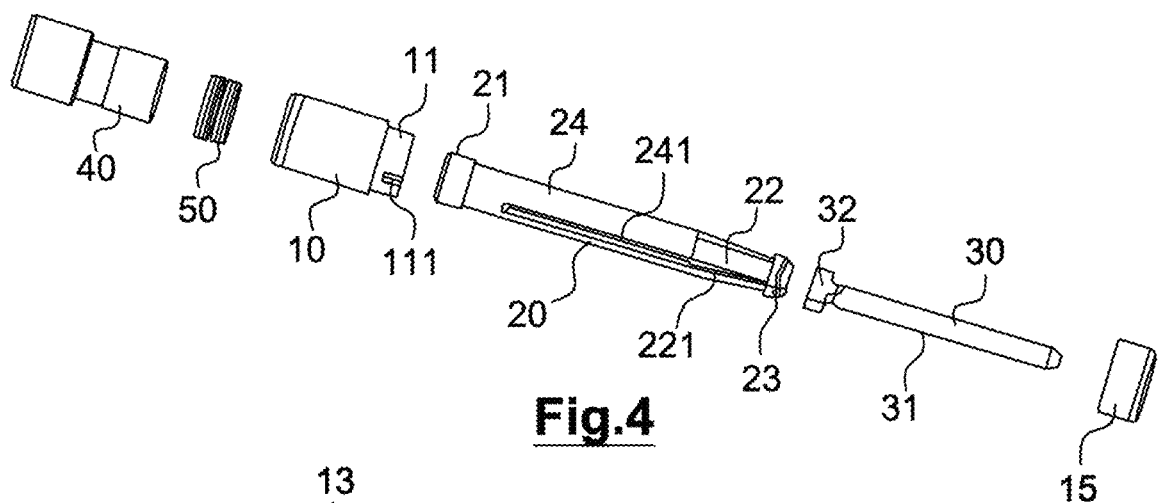
Fig.4
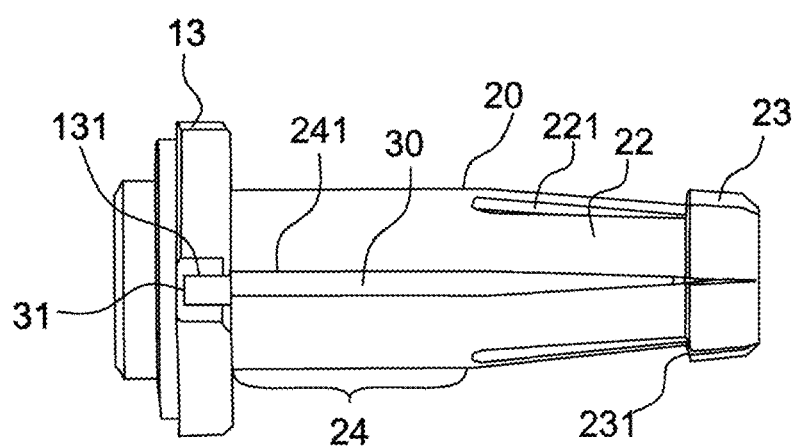
Fig.5
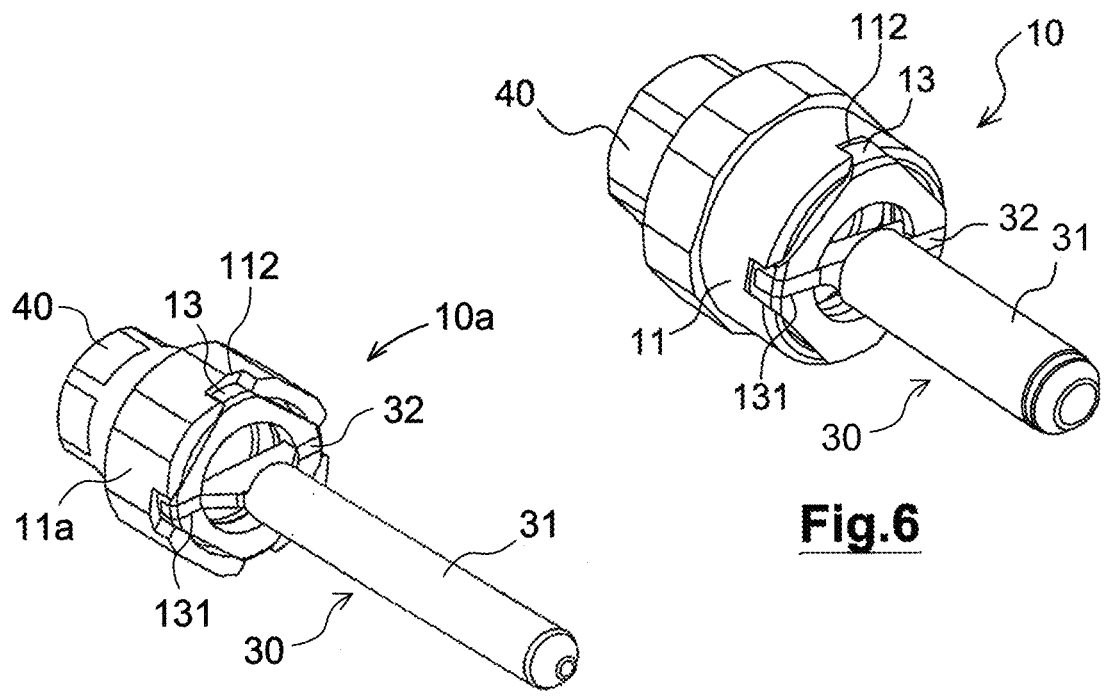
Fig.6
Fig.6A

CIRCULAR PIN CLIP WITH FIXED SPREADER

CROSS REFERENCE TO RELATED APPLICATIONS

This application is a National Stage of International Application No. PCT/EP2021/052658, filed Feb. 4, 2021, which claims priority from FR2001167 filed Feb. 6, 2020, the entire contents of which are incorporated herein by reference.

TECHNICAL FIELD

The present invention belongs to the field of mechanical fasteners, in particular temporary fasteners referred to as pin clips, and more particularly relates to a fixed spreader pin clip provided with several catching spurs, referred to as "multi-spurs".

The present invention finds a direct application in the assembly of structures, such as plates, in the aeronautical industry, for example.

PRIOR ART

It is of use, before the final fixing of plates or sheets by riveting, for example, to make a temporary assembly of the plates by means of pin clips passing through aligned holes in the plates so as to keep them in position. This assembly method is particularly used in the aeronautical construction, in particular during the joining operations between the wings and the fuselage of an aircraft.

The fixed spreader assembly clips, as described in documents FR3080155 and FR3014969 on the name of the Applicant, comprise in particular a body provided with a bearing face intended to come into contact with the outer face of one of the two parts to be assembled, a spreader fixed with respect to the body and emerging from the bearing face and an elongated element such as an elastic clamp with two branches provided with catching spurs.

Document GB959936A describes such a fixed spreader assembly clip in which the arms of the elastic clamp are connected via a crimping part to a threaded rod, the elongated element being provided with a six-sided nut allowing it to slide in the body while blocking its rotation, and a control mechanism intended to generate a relative movement between said elongated element and the body.

Thus, under the action of the control mechanism, the elongated element moves away progressively, under the action of the fixed spreader relative to the body, until the flat rear faces of the catching spurs are applied against the outer face of the second part, at the edge of the corresponding hole thereof. The parts are then firmly pressed against each other between the bearing face of the body and the rear faces of the catching spurs of the arms of the clamp.

Although these pin clips are widely used and require fewer parts than the movable spreader clips, they have certain disadvantages.

Indeed, existing fixed spreader clips have bodies with large outer diameters due to the presence of the six-sided nuts blocking the rotation of the clamps, which make their use delicate when several clips are to be inserted into closely spaced holes. Another drawback is that the bodies of these clips have large lengths, which can disrupt the stroke of a robot which is to, for example, drill or install fasteners in the vicinity of the installed clips.

PRESENTATION OF THE INVENTION

The present invention aims to overcome the drawbacks of the prior art, in particular the problem of maintaining the spreader in a circular (so-called cylindrical) clamp configuration.

To this end, the present invention relates to a pin clip, for the temporary assembly of at least two drilled structural parts, comprising a tubular main body extending along a longitudinal axis X and having a bearing face intended to come into contact with a first face of the structural parts, a clamp able to pass through aligned holes, made in said parts, the clamp being movable in translation along the longitudinal axis, driven by rotation about said axis of a tie rod provided with a tapped bore cooperating with a threaded end of said clamp, the clamp comprising flexible branches each terminating in a catching spur intended to come into contact with a rear face of the structural parts, said branches being able to move radially and progressively along a spreader, placed between said branches and fixed relative to the main body, under the effect of the recoil of the clamp. This clip is noteworthy in that the spreader comprises a transverse end locked in rotation in a locking groove provided in a fixed element with respect to the main body, and in that the clamp comprises at least one longitudinal groove capable of sliding on said transverse end during the movement of the clamp relative to the main body and capable of blocking the rotation of said clamp relative to said transverse end. At least one slot separating two adjacent branches communicates with at least the longitudinal groove of the clamp.

According to one embodiment, the locking groove is formed in an end portion of the main body.

According to another embodiment, the locking groove is made in an inner part housed in an end part of the main body, said inner part being fixed relative to said main body.

More particularly, the inner part comprises a multi-sided outer surface and the end part comprises at least one notch capable of receiving an edge of the inner part.

Alternatively, the inner part comprises a multi-sided outer surface and the end part has a multi-sided inner surface.

According to one embodiment, the bearing face corresponds to a substantially planar annular surface of a tip fitting around the end portion of the main body.

According to one embodiment, the end portion comprises a non-circular outer surface.

According to one embodiment, the spreader has a longitudinal portion of cylindrical section.

Advantageously, the tie rod is movable in rotation about the longitudinal axis X and in translation along said axis inside the main body.

According to one embodiment, the clip further comprises a spring arranged in a space inside the main body around the clamp, so as to exert a longitudinal force between a bearing surface of the main body and an annular edge of the threaded end of the clamp.

The basic concepts of the invention having been described above in their most elementary form, other details and characteristics will appear more clearly in the reading of the following description and with reference to the annexed drawings, giving, by way of non-limiting example, one embodiment of a pin clip according to the principles of the invention.

DESCRIPTION OF THE DRAWINGS

The figures and elements of the same figure are not necessarily shown at the same scale. In the whole of the figures, the identical or equivalent elements carry the same digital reference.

It is thus illustrated in:

FIG. 4 is a perspective exploded view of the clip of FIG. 2;

FIG. 5 is a side view of the clip of FIG. 1;

FIG. 6 is a partial perspective view of the clip of FIG. 1 without the clamp, leaving the spreader blocked;

FIG. 6A is a perspective view of a portion of a clip according to another embodiment of the invention;

DETAILED DESCRIPTION OF EMBODIMENTS

In the embodiment described below, reference is made to a pin clip intended primarily for the temporary assembly of at least two drilled parts, of the plate type, in the aeronautical and space industry. This non-limiting example is given for better understanding of the invention and does not exclude its use on other types of structures in related industries such as the automotive industry.

In the remainder of the description, the term "clip" is used to designate a pin clip for the temporary assembly of drilled structures.

Figure 1:
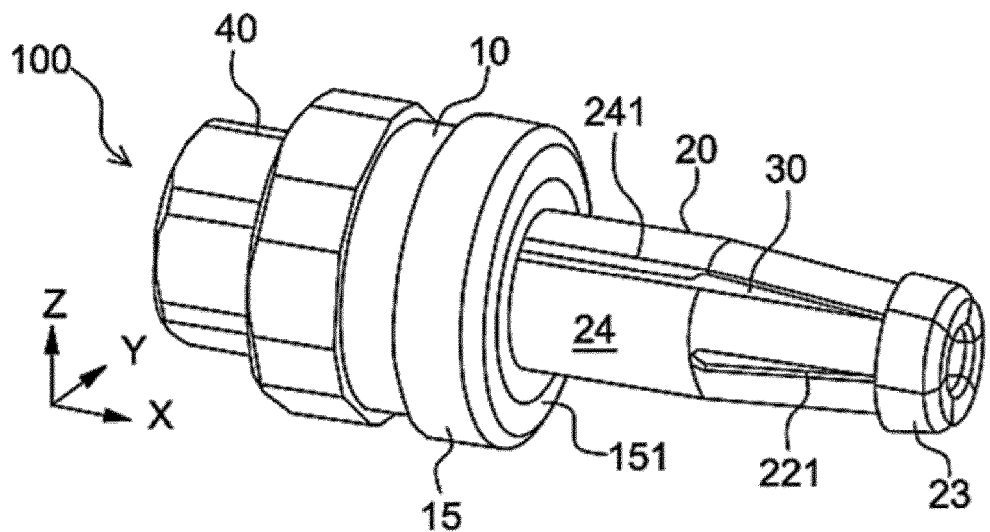
FIG. 1 is a perspective view of a pin clip according to one embodiment of the invention.
Figure 2:
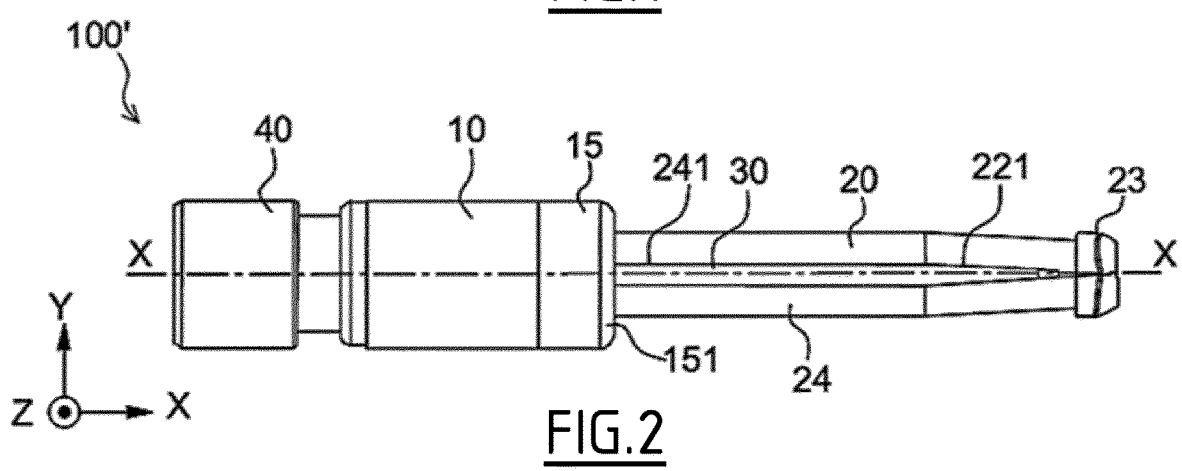
FIG. 2 is a side view of a pin clip according to another embodiment of the invention.

FIGS. 1, 5 and 6 relate to a first example of the invention, and FIGS. 2, 3, 4 and 7A to 7C relate to a second example of the invention.

The figures represent a clip 100 or 100' comprising a tubular main body 10, a clamp 20 held in the main body and extending axially outside said body, a spreader 30 fixed relative to the main body and making it possible to open the clamp in a radial direction, and a tie rod 40 actuating the clip by screwing onto the clamp 20 inside the main body 10, which allows said clamp to open by going back on the fixed spreader 30. It is understood by "tubular" a hollow elongated shape of which the straight section, which is not necessarily circular, can be polygonal or comprise portions of various shapes and/or diameters.

Figure 3:
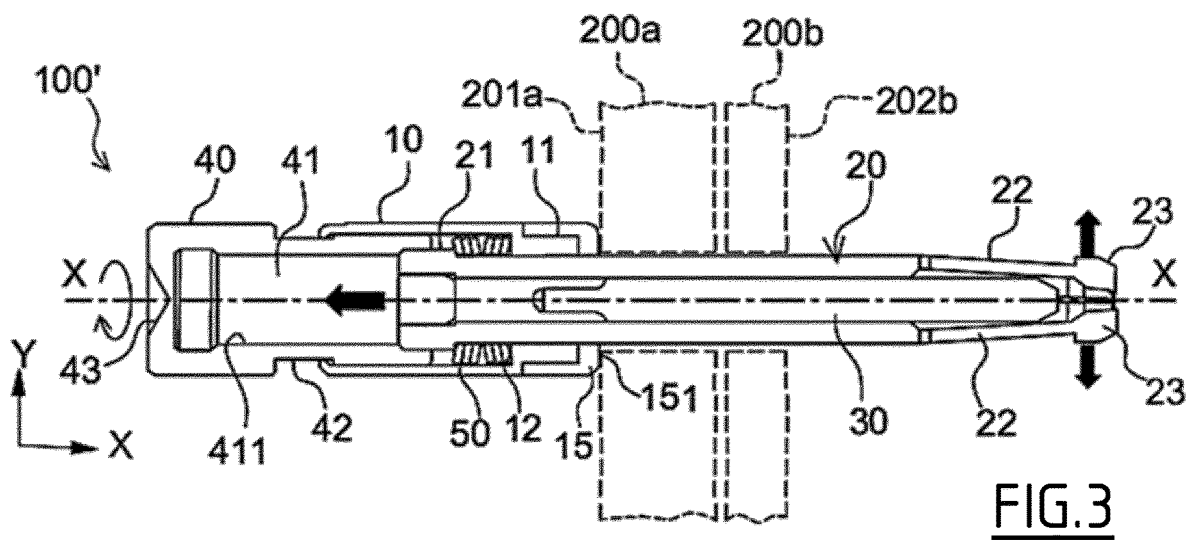
FIG. 3 is a cross section of the clip of FIG. 2, in the initial position in an assembly of parts.

With reference to FIG. 3, the clip 100' makes it possible to temporarily assemble at least two drilled parts 200a and 200b, by pressing them firmly against each other, by their compression between the main body 10 and the clamp 20, said clamp passing through aligned holes made in said parts. The resulting compression force is controlled by the clamping of the clip.

The main body 10, according to the examples illustrated, has a generally cylindrical shape of circular cross-section and has at one of its ends an end portion 11 closed by an end piece 15 intended to come into contact with the parts to be assembled. The end portion 11 has a smaller diameter than the main body so as to define a shoulder against which the end piece 15 bears. The end portion 11 may have a threaded circular outer shape for receiving a threaded tip, or a non-circular outer shape, for example a square or six-sided shape. For example, the exemplary main body 10a illustrated in FIG. 6A includes an end portion 11a with a six-sided outer shape. In the example of FIGS. 1, 5 and 6, the end portion 11 comprises notches 112 for receiving the corners of an internal piece 13 distinct from the body 10, drilled on the one hand, having a generally square outer shape. The rotation of the part 13 is thus blocked in the main body 10. Of course, other combinations of shapes of the internal part 13 and of the main body 10 are possible, such as for example a combination of male multi-panel shapes in a female multi-panel shape, with a number of identical or multiple panels allowing the internal part to be interlocked without rotating the internal part in the main body.

The end piece 15 can, for example, be threaded or snap-fitted by clipping or snap-fitting around the end portion 11 of the main body 10, and defines an annular, preferably planar bearing face 151, in order to improve the contact with the parts to be assembled. Additionally, the end piece 15 has a rounded edge at the periphery of its bearing surface 151 in order to limit the damage to the parts in contact with said surface.

When the end portion 11 is of a non-circular shape, the end piece 15 has a complementary shape allowing the end piece to be attached to the end portion while blocking its rotation.

As a variant not shown, the bearing surface 151 is formed by an annular surface of the end piece, and by an annular surface of the end 11 of the main body 10 or of the inner part 13 according to the example of FIGS. 5 and 6.

In another variant not shown, the clip does not comprise a tip, and the bearing surface 151 is formed directly by one end of the main body 10, for example by deforming this end radially inwards or outwards.

The clamp 20, with reference to FIGS. 3 and 4, is tubular and has a threaded end 21 and a second end provided with flexible branches 22, each of which terminates in a catching spur 23.

In the rest position (FIGS. 1 and 2), the spurs converge towards each other so that the branches 22 form a frusto-conical bend.

The clamp 20 also includes a cylindrical portion 24 extending between the threaded end 21 and the branches 22 along the longitudinal axis X.

The branches 22 are regularly spaced and define a plurality of slots 221, each between two adjacent branches. According to the examples illustrated, two diametrically opposed slots 221 extend into the cylindrical portion 24 of the clamp 20 to form an anti-rotation groove 241, up to the vicinity of the threaded end 21.

As a variant not shown, only one slot 221 extends into the cylindrical portion 24 of the clamp to form an anti-rotation groove 241.

The threaded end 21, shown in cross section in FIG. 3, is of hollow cylindrical shape and has a thread on its outer lateral surface.

The spreader 30, with reference to FIG. 4, is a T-shaped rod having a longitudinal portion 31, preferably of circular cross-section, and a transverse portion 32 forming the head of the retractor. The circular section of the longitudinal portion 31 is dimensioned to allow the cylindrical section 24 of the clamp and the branches 22 to slide over said longitudinal portion. The longitudinal portion 31 also has a length less than the length of the clamp 20 so that the spurs 23 of the branches 22 converge and have an outer diameter at most equal to the outer diameter of the cylindrical portion 24 of the clamp.

Alternatively, the longitudinal portion could have a rectangular, cruciform or oval cross-section.

In the examples shown, the head 32 of the spreader 30 is formed of two flats, placed in a diametrical groove 111 of the end portion 11 of the body 10 (example of FIG. 4) or in a groove 131 of the inner piece 13 (example of FIG. 6) so that the spreader 30 is locked in rotation, with a functional clearance, relative to the body as shown in FIG. 6.

With reference to the exploded view of FIG. 4, the spreader 30 is inserted longitudinally into two slots 221 communicating with two grooves 241 of the clamp 20, said grooves allowing the passage of the flats of the head 32 of the spreader, said head is then locked in the groove 111 of the main body 10. Thus, the spreader 30 is locked in rotation with respect to the main body, and also prevents the rotation of the clamp 20, said clamp being blocked in rotation by means of the grooves 241 sliding on the flats of the head 32 of the spreader during the movement of the clamp.

In the variant comprising a single anti-rotation groove 241, the head of the spreader comprises, of course, only one flat designed to slide in the slot 221 associated with said groove.

The spreader 30, fixed with respect to the main body 10, makes it possible to open the clamp 20 by moving the branches 22 away from one another under the effect of a displacement, in particular a recess, of the said clamp relative to the main body. This movement is produced by the actuation of the tie rod 40 which constitutes the control member of the clip 100, 100'.

The tie rod 40, with reference to FIG. 3, has a generally cylindrical shape with a circular cross-section of varying diameter, the diameter being larger at the free end of the tie rod, which corresponds to a manual gripping zone by the user, in order to reduce the required clamping force or at least pre-tightening before the use of tools. This variable section defines a groove 42 upstream of the main body 10, between the free end of the tie rod and its opposite end housed inside the main body 10. Indeed, the tie rod 40 is mounted, in the main body 10, in an X-axis sliding pivot connection.

The tie rod 40 has at its closed end a recess 43 adapted to receive the clamp of another clip. Indeed, when several clips are conveyed by a pipe one behind the other in a robotic supply and delivery system, the recess 43 makes it possible to center the clips in the pipe.

According to the illustrated embodiment, the recess is a cone, for example a cone defining an angle of 120°, and of axis substantially coincident with the longitudinal axis X of the clip. The shape of the footprint may vary to accommodate other forms of clamps. The recess is optional, and the tie may be closed by a wall or open without this impacting the operation of the clip.

Preferably but not mandatory, an elastic member 50 is placed in a space inside the main body around the cylindrical portion 24 of the clamp 20, so as to exert a longitudinal force between a bearing surface 12 of the main body 10 and an annular edge of the threaded end 21 as shown in FIG. 3. In the example of FIG. 3, the elastic element is composed of Belleville washers, but a compression spring could alternatively be used. The function of the elastic element is to maintain a constant compressive force on the two drilled parts 200a and 200b, despite the creep of a mastic interposed between the parts 200a and 200b, which would reduce the thickness of the parts clamped by the clip. The elastic element 50 also absorbs the potential vibrations perceived by the clip placed in the structure when drilling the skin of an aircraft, for example.

The elastic element 50 permanently exerts a force along the longitudinal axis X tending to push the clamp 20 in the direction of withdrawal, namely towards the bore 41 of the tie rod 40.

The clip 100 or 100' as described makes it possible to temporarily assemble the two parts 200a and 200b, which may also be of different thicknesses, for the final fixing thereof by riveting, for example. The clip can also be used in the case of a plurality of parts to be assembled.

To do this, the clamp 20 is initially inserted into the bores of said parts, which are aligned, the clip being in a minimum clamping position with the clamp in the closed position. Still in the minimum clamping position, the clip is inserted into the parts by means of its clamp 20 until the bearing face 151 of the end piece 15 of the main body 10 comes into contact with a front face 201a of the first part 200a.

Then, the clip is clamped progressively by the rotation of the tie rod 40, movable in rotation and in translation with respect to the main body 10, in order to return the catching spurs 23 of the branches 22 bearing against a rear face 202b of the second part 200b. Indeed, as explained above, the rotation of the tie rod 40 produces a translation of the clamp 20 along the longitudinal direction X, due to the cooperation between the threads 411 of the threaded bore 41 and the threaded end 21 initially engaged in said bore. The displacement of the clamp 20 thus corresponds to its partial removal inside the tie rod 40. The clamping of the clip is then continued until a maximum clamping position which corresponds to a firm compression of the parts 200a and 200b between the main body 10 and the catching spurs 23. In this position, the catching spurs 23 are in contact with the rear face 202b of the second part 200b by their catching surfaces 231.

The attachment of the rear face 202b, or more precisely of the wall of the bore of said face, of the second part 200b is made possible by the opening of said clamp as the clip is clamped, this opening resulting in a spacing of the branches 22 so that the outer diameter of the spurs 23, of the annular surface formed by the catching surfaces 231, is greater than the diameter of the bore of the second part 200b in which the clip is inserted.

Indeed, the movement of the clamp 20 and, thereby, of its branches 22, in the direction from the main body 10 towards the tie rod 40, causes a spacing of the branches 22 on the spreader 30, the latter remaining fixed relative to the main body 10.

The profile of the branches 22, and in particular the internal profile in contact with the spreader 30, has a shape suitable for the said branches to begin to move apart from one another upon the start of the clamping of the clip.

Figure 7A:
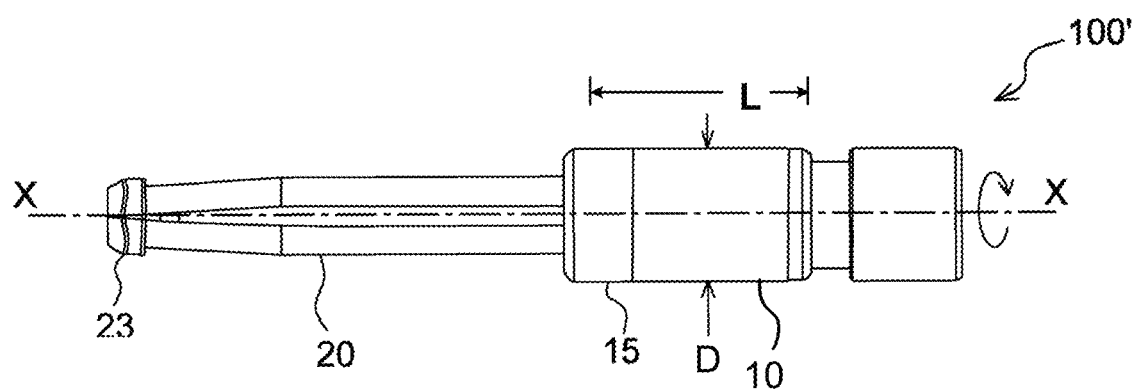
FIG. 7A is a pin clip according to the invention in a minimum clamping position.
Figure 7B:
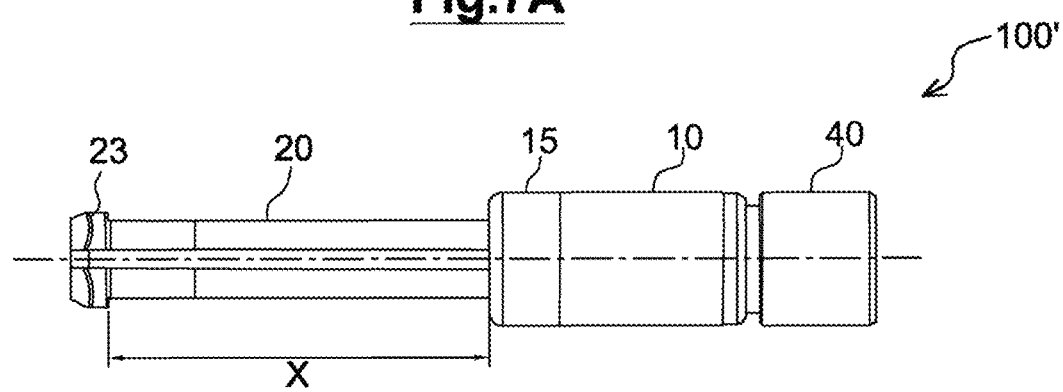
FIG. 7B is a pin clip according to the invention in an intermediate clamping position.
Figure 7C:
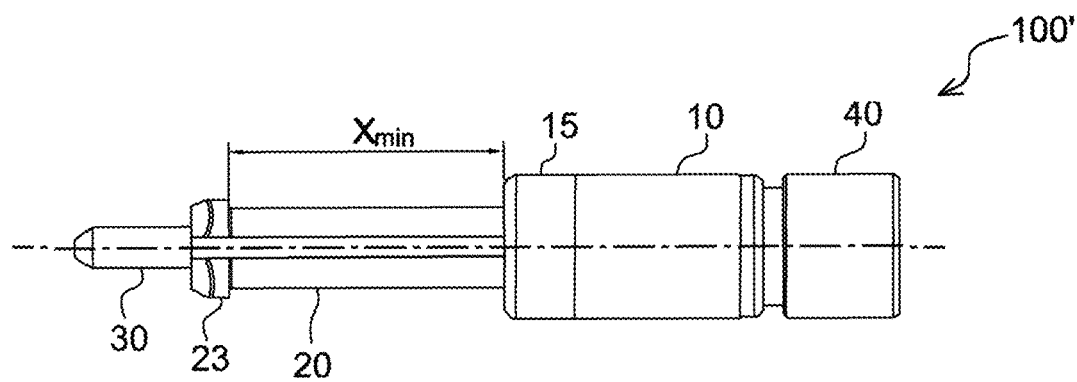
FIG. 7C is a pin clip according to the invention in a maximum clamping position.

The spacing of the legs 22 of the clamp 20 may continue until the spreader 30 passes through the catching spurs 23 as shown in FIG. 7C.

Thus, the force exerted by the catching spur, then in contact with the wall of the hole of the rear part of the assembly, drives the latter against the other parts, the outer front part of which is abutted against the bearing face of the main body. The parts are therefore firmly pressed.

FIGS. 7A to 7C illustrate the clip in successive clamping positions, in which the stroke x of the clamp 20 decreases progressively as the clamp reaches the minimum stroke $x_{min}$ corresponding to the smallest total thickness of an assembly for which the clip 100 can be used.

Preferably, the clip has a larger diameter D, for example at its main body 10.

The largest diameter D and the length L of the body can be reduced relative to the fixed spreader clips of the prior art because the six-sided nut of the prior art clips has been removed, due to the transfer of the anti-rotation function of the clamps to the head of the spreader. The length of the body is also reduced because the clamps and the threaded rod can be made of one and the same piece, and no longer require a crimping portion, nor a six-sided nut. Due to the removal of the six-sided nut, a larger effective length of the clamp can be engaged in the tie rod, while making it possible to reduce the overall length of the assembly formed by the body and the tie rod.

Thus, the invention makes it possible to design fixed spreader clips which can pass through bores which vary between 3.2 mm and 6.35 mm for a body diameter of 10.6 mm against a body diameter of 12.7 mm for the existing clips.

In view of the present description, certain elements of the invention may be made differently or replaced by other equivalent elements without departing from the scope of the invention, which is not limited to the only examples described and illustrated. For example, the number of branches of the cylindrical clamp may vary, and the shape of the transverse element of the spreader may also vary and vary as a result the number of diametrical grooves used to lock it.

The invention claimed is:

1. A clip for temporarily assembling at least two drilled structural parts, comprising:
    a tubular main body extending along a longitudinal axis X and having a bearing face intended to come into contact with a first face of the structural parts,
    a spreader, and
    a clamp able to pass through aligned holes, made in said structural parts, the clamp being movable in translation along the longitudinal axis X, driven by rotation about said longitudinal axis X of a tie rod provided with a threaded bore cooperating with a threaded end of said clamp, the clamp including flexible branches each terminating in a hooking nose intended to come into contact with a rear face of the structural parts, said flexible branches defining a plurality of pairs of adjacent branches and being able to move radially and progressively along the spreader, which is placed between said flexible branches and fixed with respect to the main body, under an effect of a recoil of the clamp, wherein
    the spreader includes a transverse end rotationally fixed in a locking groove provided in a fixed element with respect to the main body,
    the clamp further includes one or more longitudinal grooves capable of sliding on said transverse end when the clamp moves relative to the main body and capable of blocking a rotation of said clamp relative to said transverse end,
    each pair of adjacent branches of the clamp are separated by a respective one of a plurality of slots, and
    at least one of the plurality of slots is aligned with and communicates with one of the one or more longitudinal grooves of the clamp and at least one slot of the plurality of slots is offset from all of the one or more longitudinal grooves of the clamp.

2. The clip according to claim 1, wherein the locking groove is made in an inner part housed in an end part of the main body, said inner part being fixed relative to said main body.

3. The clip according to claim 2, wherein the inner part comprises a multi-sided outer surface and the end part comprises at least one notch adapted to receive an edge of the inner part.

4. The clip according to claim 2, wherein the inner part comprises a multi-sided outer surface and the end part has a multi-sided inner surface.

5. The clip according to claim 1, wherein the locking groove is formed in an end portion of the main body.

6. The clip according to claim 5, wherein the bearing face corresponds to a substantially planar annular surface of a tip fitting around the end portion of the main body.

7. The clip according to claim 1, wherein the spreader has a longitudinal portion of cylindrical section.

8. The clip according to claim 1, wherein the tie rod is movable in rotation about the longitudinal axis X and in translation along said longitudinal axis X inside the main body.

9. The clip according to claim 1, further comprising a spring arranged in a space inside the main body around the clamp, so as to exert a longitudinal force between a bearing surface of the main body and an annular edge of the threaded end of the clamp.

10. A clip for temporarily assembling at least two drilled structural parts, comprising a tubular main body extending along a longitudinal axis X and having a bearing face intended to come into contact with a first face of the structural parts, a clamp able to pass through aligned holes, made in said structural parts, the clamp being movable in translation along the longitudinal axis X, driven by rotation about said longitudinal axis X of a tie rod provided with a threaded bore cooperating with a threaded end of said clamp, the clamp comprising flexible branches each terminating in a hooking nose intended to come into contact with a rear face of the structural parts, said flexible branches being able to move radially and progressively along a spreader, placed between said flexible branches and fixed with respect to the main body, under an effect of a recoil of the clamp,
    the spreader having a transverse end rotationally fixed in a locking groove provided in a fixed element with respect to the main body,
    the clamp comprising at least one longitudinal groove capable of sliding on said transverse end when the clamp moves relative to the main body and capable of blocking a rotation of said clamp relative to said transverse end,
    the clip being characterized in that at least one slot separating two adjacent branches communicates with at least the at least one longitudinal groove of the clamp,
    wherein the locking groove is formed in an end portion of the main body,
    wherein the bearing face corresponds to a substantially planar annular surface of a tip fitting around the end portion of the main body, and
    wherein the end portion has a non-circular outer surface.

11. The clip according to claim 10, wherein the spreader has a longitudinal portion of cylindrical section.

12. The clip according to claim 10, wherein the tie rod is movable in rotation about the longitudinal axis X and in translation along said longitudinal axis X inside the main body.

13. The clip according to claim 10, further comprising a spring arranged in a space inside the main body around the clamp, so as to exert a longitudinal force between a bearing surface of the main body and an annular edge of the threaded end of the clamp.

* * * * *